(12) United States Patent
Reid et al.

(10) Patent No.: US 10,960,481 B2
(45) Date of Patent: Mar. 30, 2021

(54) METHOD FOR MODIFYING AN APERTURE AND SYSTEM FOR MODIFYING FLOW THROUGH A COMPONENT

(71) Applicant: GENERAL ELECTRIC COMPANY, Schenectady, NY (US)

(72) Inventors: Thomas Robert Reid, Newark, DE (US); Jonathan Matthew Lomas, Simpsonville, SC (US); Gary Charles Shubert, Woodruff, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 516 days.

(21) Appl. No.: 15/656,063

(22) Filed: Jul. 21, 2017

(65) Prior Publication Data
US 2017/0334010 A1 Nov. 23, 2017

Related U.S. Application Data

(62) Division of application No. 14/082,814, filed on Nov. 18, 2013, now Pat. No. 9,744,614.

(51) Int. Cl.
*B23K 9/04* (2006.01)
*F01D 5/28* (2006.01)
(Continued)

(52) U.S. Cl.
CPC .............. *B23K 9/044* (2013.01); *B23K 9/048* (2013.01); *B23K 9/173* (2013.01); *B23K 9/32* (2013.01);
(Continued)

(58) Field of Classification Search
CPC ............. F05D 2230/30; F05D 2230/31; F05D 2230/311; F05D 2230/12; B23K 9/044; B23K 9/32
See application file for complete search history.

(56) References Cited

U.S. PATENT DOCUMENTS 4,762,464 A 8/1988 Vertz et al.
4,808,785 A 2/1989 Vertz et al.
(Continued)

FOREIGN PATENT DOCUMENTS

EP 0503696 B1 9/1992
EP 1884306 A1 2/2008

OTHER PUBLICATIONS

"Electrospark Deposition Studies for Gas Turbine Engine Component Repair", Replacement of Hard Chrome Plating Program Review Meeting, Nov. 18-19, 2003, Kennedy Space Center Visitors Center, Advanced Surfaces and Processes, Inc., Cornelius, OR.
(Continued)

*Primary Examiner* — Geoffrey S Evans
(74) *Attorney, Agent, or Firm* — McNees Wallace & Nurick LLC

(57) ABSTRACT

A method for modifying an aperture in a component, a system for modifying flow through a component, and a turbine component are disclosed. The method includes providing a substrate having at least one aperture having an electrically-conductive surface, providing a deposition device including an ESD torch, the ESD torch including an aperture penetrating electrode including a conductive material, inserting the aperture penetrating electrode at least partially into the aperture, and generating an arc between the aperture penetrating electrode and the electrically-conductive surface to deposit electrode material within the aperture. The system includes the ESD torch removably supported in an electrode holder. The turbine component includes at least one aperture having an electrospark deposited material along an electrically-conductive surface, the electrospark deposited material providing modified fluid flow through the turbine component.

18 Claims, 5 Drawing Sheets

(51) Int. Cl.

| | |
|---|---|
| *F23R 3/00* | (2006.01) |
| *F02C 7/22* | (2006.01) |
| *F01D 5/22* | (2006.01) |
| *B23K 9/173* | (2006.01) |
| *B23K 9/32* | (2006.01) |
| *B23P 15/02* | (2006.01) |
| *B23P 15/04* | (2006.01) |
| *F01D 5/12* | (2006.01) |
| *B23K 101/00* | (2006.01) |
| *B23K 103/18* | (2006.01) |
| *F01D 5/00* | (2006.01) |
| *F01D 5/18* | (2006.01) |

(52) U.S. Cl.
CPC .............. *B23P 15/02* (2013.01); *B23P 15/04* (2013.01); *F01D 5/12* (2013.01); *F01D 5/225* (2013.01); *F01D 5/286* (2013.01); *F02C 7/22* (2013.01); *F23R 3/002* (2013.01); *B23K 2101/001* (2018.08); *B23K 2103/26* (2018.08); *B23P 2700/06* (2013.01); *F01D 5/005* (2013.01); *F01D 5/186* (2013.01); *F05D 2230/12* (2013.01); *F05D 2230/80* (2013.01); *F05D 2260/20* (2013.01); *Y10T 428/13* (2015.01); *Y10T 428/24273* (2015.01)

(56) References Cited

U.S. PATENT DOCUMENTS

| | | | |
|---|---|---|---|
| 4,992,639 A | 2/1991 | Watkins et al. | |
| 5,641,477 A * | 6/1997 | Syed | A61Q 5/04 424/70.4 |
| 6,408,610 B1 | 6/2002 | Caldwell et al. | |
| 6,417,477 B1 * | 7/2002 | Brown | B23K 9/04 219/76.13 |
| 6,623,790 B2 | 9/2003 | Fernihough et al. | |
| 6,835,908 B2 | 12/2004 | Bailey et al. | |
| 7,019,257 B2 | 3/2006 | Stevens | |
| 7,572,997 B2 | 8/2009 | Kao et al. | |
| 8,245,519 B1 | 8/2012 | Liang | |
| 2001/0027749 A1 * | 10/2001 | Kinbara | B23H 1/022 118/308 |
| 2003/0075587 A1 * | 4/2003 | Smashey | B23P 6/007 228/119 |
| 2004/0140292 A1 * | 7/2004 | Kelley | F41A 21/22 219/76.13 |
| 2005/0242069 A1 * | 11/2005 | Stager | C23C 4/131 219/121.47 |
| 2008/0118664 A1 * | 5/2008 | Goto | C23C 26/02 427/580 |
| 2009/0056096 A1 | 3/2009 | Hixson et al. | |
| 2012/0128893 A1 | 5/2012 | Furukawa et al. | |
| 2012/0198676 A1 | 8/2012 | Rickenbacher et al. | |
| 2012/0321825 A1 | 12/2012 | Ahmad et al. | |
| 2013/0333180 A1 * | 12/2013 | Zanon | B23P 6/00 29/402.18 |
| 2014/0027410 A1 * | 1/2014 | Lin | B23K 9/048 219/76.13 |
| 2014/0050938 A1 * | 2/2014 | Lin | C23C 26/02 428/596 |
| 2016/0008889 A1 * | 1/2016 | Xu | F01D 5/186 219/76.12 |

OTHER PUBLICATIONS

Champagne et al., "Electrospark Deposition for the Repair of Army Main Battle Tank Components", Army Research Laboratory, Aberdeen Proving Ground, MD, Jul. 2006, pp. 1-38.

Price, "Electrospark Deposition Studies for Gas Turbine Engine Component Repair", HCAT Program Review Meeting, Grandover Resort & Conference Center, Greensboro, NC, Mar. 17, 2005, pp. 1-26.

Johnson et al., "Electro-Spark Deposited Coatings for Replacement of Chrome Plating", Pacific Northwest National Laboratory, Richland, WA, Jun. 2005, pp. 1-59.

European Search Report and Opinion issued in connection with corresponding EP Application No. 14192343.3 dated May 12, 2015.

\* cited by examiner

US 10,960,481 B2

METHOD FOR MODIFYING AN APERTURE AND SYSTEM FOR MODIFYING FLOW THROUGH A COMPONENT

CROSS-REFERENCE TO RELATED APPLICATIONS

This application is a divisional of U.S. Utility patent application Ser. No. 14/082,814, filed on Nov. 18, 2013, now U.S. Pat. No. 9,744,614, and entitled "METHOD FOR MODIFYING AN APERTURE AND SYSTEM FOR MODIFYING FLOW THROUGH A COMPONENT", the disclosure of which is hereby incorporated by reference in its entirety.

FIELD OF THE INVENTION

The present invention is directed to methods for modifying flow through apertures. More particularly, the present invention is directed to an electrospark deposition on the surfaces of cooling holes to modify flow.

BACKGROUND OF THE INVENTION

Gas turbine components are subjected to thermally, mechanically, and chemically hostile environments. For example, in the compressor portion of a gas turbine, atmospheric air is compressed, for example, to 10-25 times atmospheric pressure, and adiabatically heated, for example, to 800°-1250° F. (427° C.-677° C.), in the process. This heated and compressed air is directed into a combustor, where it is mixed with fuel. The fuel is ignited, and the combustion process heats the gases to very high temperatures, for example, in excess of 3000° F. (1650° C.). These hot gases pass through the turbine, where airfoils fixed to rotating turbine disks extract energy to drive the fan and compressor of the turbine, and the exhaust system, where the gases provide sufficient energy to rotate a generator rotor to produce electricity. To retain sufficient strength and avoid oxidation/corrosion damage at high temperatures, coatings have been applied to the surface of metallic components and cooling schemes have been implemented so that the components function well and meet the designed life.

To improve the efficiency of operation of gas turbines, combustion temperatures have been consistently raised. With the higher temperatures, the materials used to make the component become too weak to accomplish their functions or even start to melt. Traditionally, air is used for temperature control. This requires cooling holes to be drilled through the critical locations in a coated component. A typical high temperature gas turbine blade or vane may contain hundreds of small cooling holes on the airfoil surfaces to cool metal components, for example, there can be over 700 cooling holes in a stage-1 nozzle of a typical advanced gas turbine, which is usually coated with a thermal barrier coating (TBC).

A significant challenge in the manufacture or repair of cooled turbine components is ensuring the flow of cooling air is correct to provide the proper amount of cooling. If the flow is too low, there is potential for backflow margin and potential for the component to become too hot, resulting in potential damage to the component. If the flow is too high, there are turbine performance concerns. If a component flow is too low, holes can be reopened or enlarged to allow for additional flow. However, when a part flows too high, known methods for modifying flow require that the component be stripped of its TBC coating, recoated with a new TBC coating and re-clear the cooling holes in an attempt to restore flow to the desired values. This is an expensive and time consuming option and has no guarantee of fixing the issue.

A method for modifying the flow through apertures, such as cooling holes, that does not suffer from one or more of the above drawbacks would be desirable in the art.

Intended advantages of the disclosed systems and/or methods satisfy one or more of these needs or provide other advantageous features. Other features and advantages will be made apparent from the present specification. The teachings disclosed extend to those embodiments that fall within the scope of the claims, regardless of whether they accomplish one or more of the aforementioned needs.

BRIEF DESCRIPTION OF THE INVENTION

In an exemplary embodiment, a method for modifying an aperture in a component includes providing a substrate having at least one aperture having an electrically-conductive surface, providing a deposition device including an ESD torch, the ESD torch including an aperture penetrating electrode including a conductive material, inserting the aperture penetrating electrode at least partially into the aperture, and generating an arc between the aperture penetrating electrode and the electrically-conductive surface to deposit electrode material within the aperture.

In another exemplary embodiment, a system for modifying flow through a component includes an ESD torch removably supported in an electrode holder, the ESD torch including an aperture penetrating electrode. The aperture penetrating electrode is configured to apply an electrode material to a conductive surface in an aperture to modify flow through the aperture.

In another exemplary embodiment, a turbine component includes at least one aperture having an electrospark deposited material along an electrically-conductive surface, the electrospark deposited material providing modified fluid flow through the turbine component.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are a method for modifying an aperture in a component, a system for modifying flow through a component, and a turbine component. Embodiments of the present disclosure, for example, in comparison to methods that do not include one or more of the features disclosed herein, enhance functional properties of machined features (for example cooling holes on turbine components) and physical/mechanical properties of materials nearby, enhance physical properties of materials and/or machined features (for example, cooling holes on turbine components), provide additional cooling flow control, permit reducing the size of an existing cooling hole without stripping and recoating, or combinations thereof.

Figure 1:
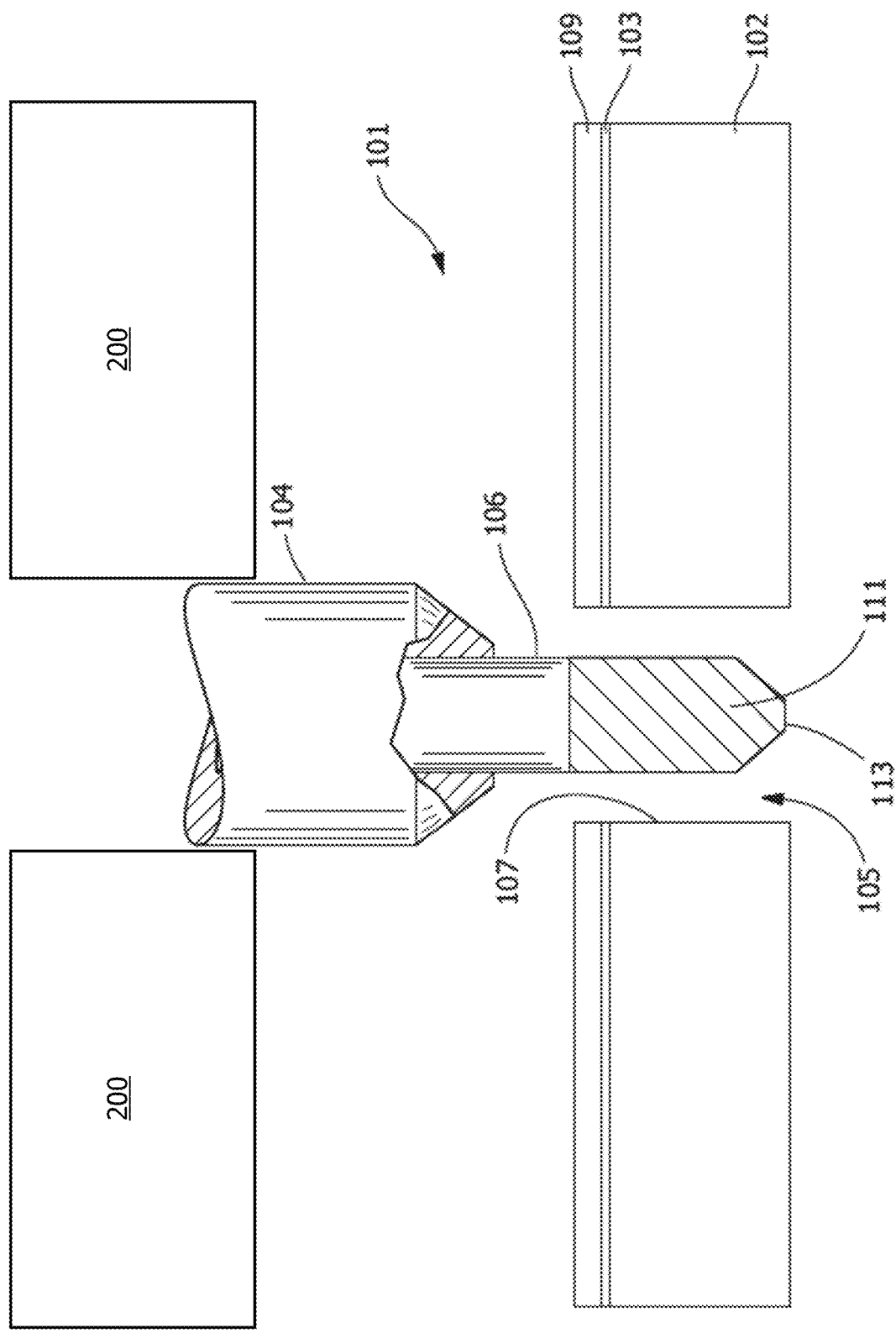
FIG. 1 shows a schematic arrangement for modifying an aperture, according to an embodiment of the disclosure.
Figure 2:
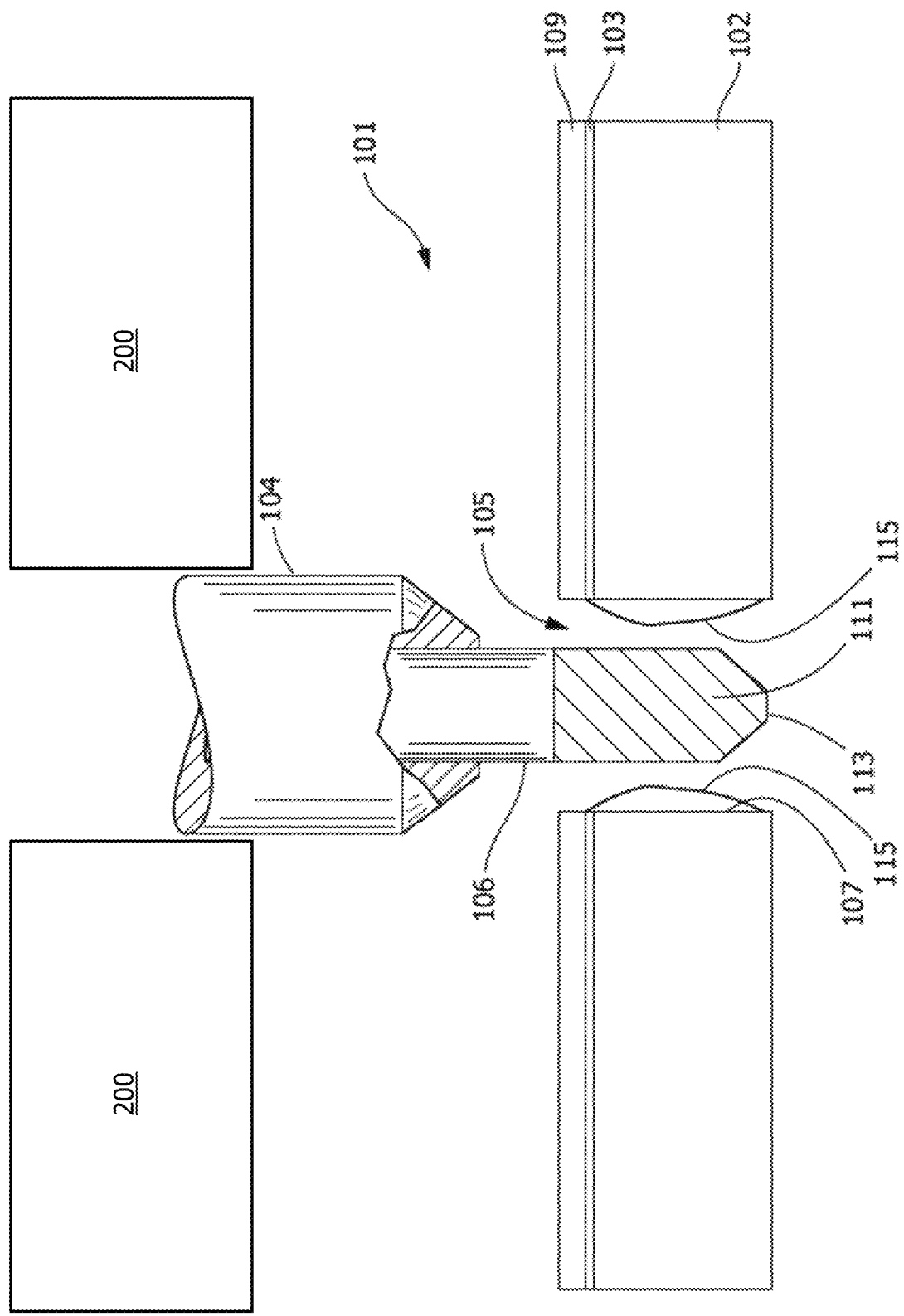
FIG. 2 shows a cross-sectional view of a modified aperture, according to an embodiment of the disclosure.
Figure 3:
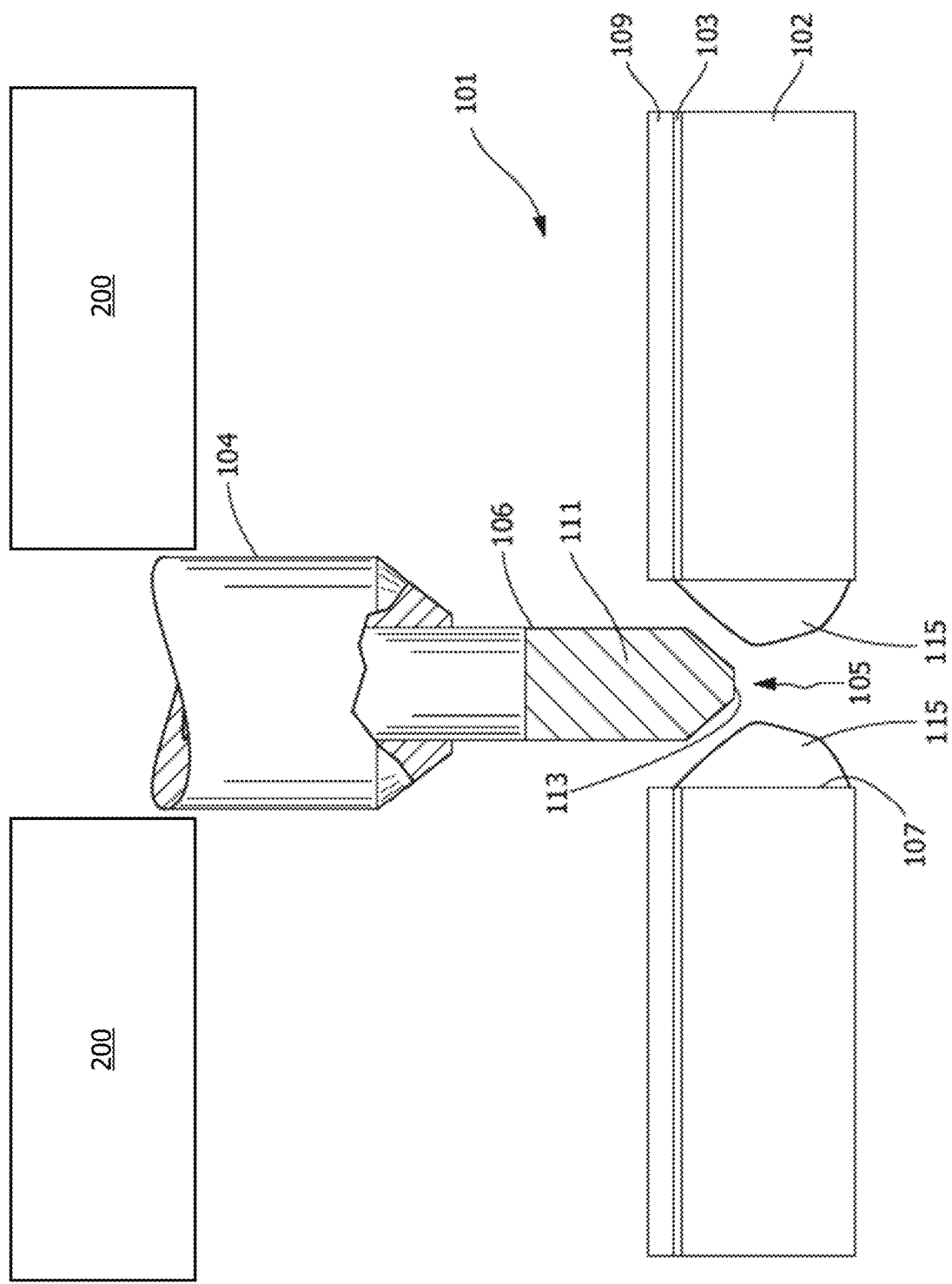
FIG. 3 shows a cross-sectional view of a modified aperture, according to an embodiment of the disclosure.

FIGS. 1-3 show a system for modifying flow through a component 101 including electrospark deposition (ESD) equipment, and an ESD torch 104. Component 101 includes a bond coat layer 103 and a non-electrically-conductive layer 109, such as a thermal barrier coating (TBC). The ESD torch 104 includes an aperture penetrating electrode 106 configured to deposit an electrode material 111 on an electrically-conductive surface 107 within or near interior surfaces of an aperture 105. The term "aperture penetrating electrode", as utilized herein, means an electrode configured to fit inside an aperture by partial or full insertion of the electrode into the aperture. In one embodiment, the ESD torch 104 is mounted in an electrode holder 200, the electrode holder 200 being any suitable device for supporting the ESD torch 104 and maintaining a position of the ESD torch 104, and/or manipulating the position of the ESD torch 104. It is noted that the ESD torch 104 can be held or supported by any suitable method or apparatus. In some embodiments, the electrode holder 200 is a movable frame. For example, in one embodiment, the ESD torch 104 is mounted in a movable frame capable of advancing the aperture penetrating electrode 106 into the aperture 105. The movable frame supports the ESD torch 104, inserts the aperture penetrating electrode 106 into the aperture 105, maintains the aperture penetrating electrode 106 within the aperture 105, and/or withdraws the aperture penetrating electrode 106 from the aperture 105. The electrode holder 200 provides increased control over the position of the aperture penetrating electrode 106 to increase control over deposit of the electrode material 111.

The ESD torch 104 is electrically connected to the ESD equipment by an electrical connection (not shown). Electrical current permits the ESD torch 104 to generate a spark to melt a portion of the aperture penetrating electrode 106, and transfer the electrode material 111 to the electrically-conductive surface 107 within the aperture 105. In one embodiment, the ESD torch 104 and associated equipment include an ESD power source. The deposition rate for the ESD torch 104 varies depending on an application speed determined by the user.

Figure 4:
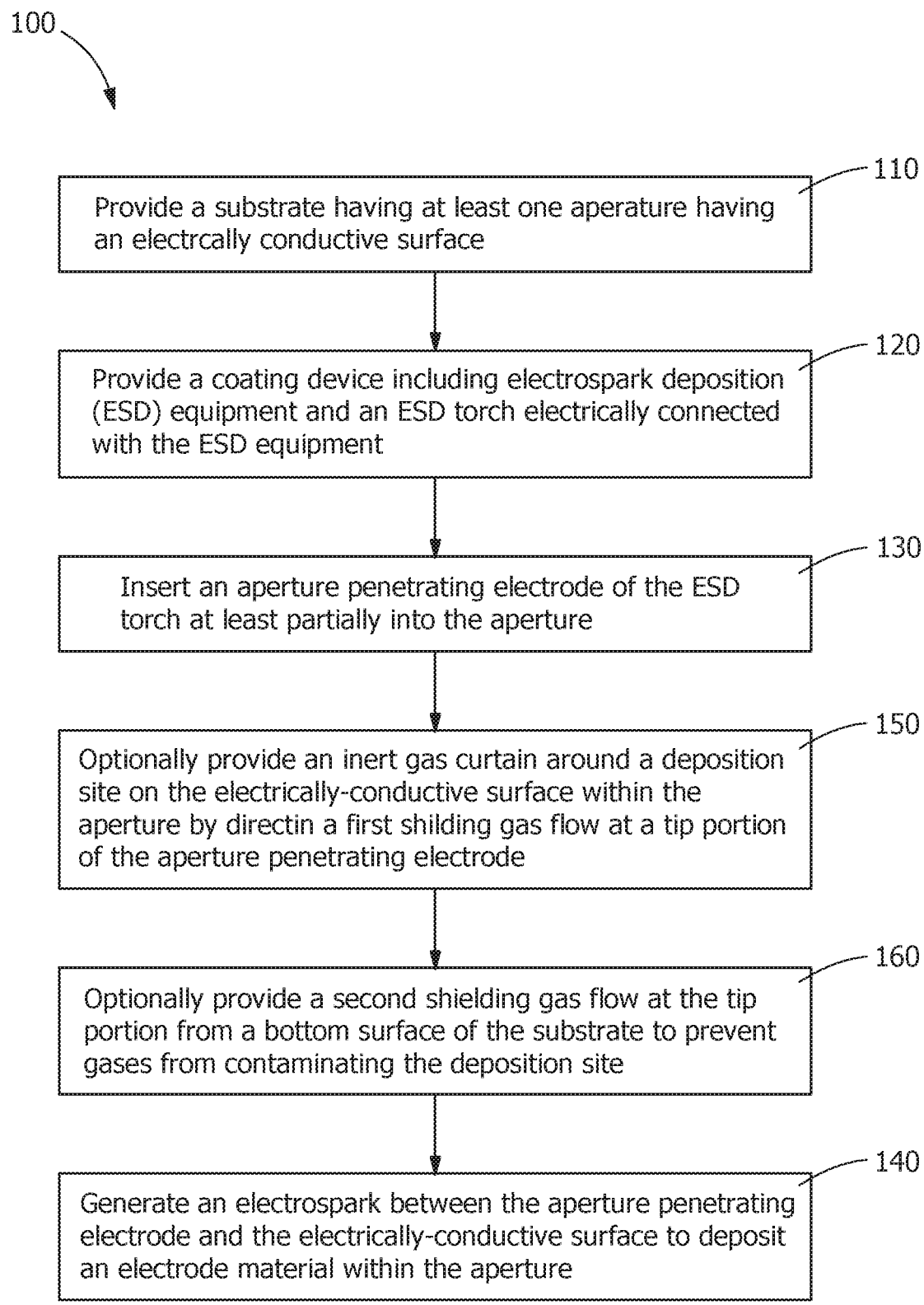
FIG. 4 shows a flow chart of a method for modifying an aperture in a component, according to an embodiment, of the disclosure.

FIG. 4 shown an exemplary method 100 for modifying the aperture 105 in component 101. The method includes providing a substrate 102 having at least one aperture 105 having the electrically-conductive surface 107 (step 110), providing a deposition device including the electrospark deposition (ESD) equipment and the ESD torch 104, electrically connected with the ESD equipment (step 120), inserting the aperture penetrating electrode 106 of the ESD torch 104 at least partially into the aperture 105 (step 130), and generating an arc between the aperture penetrating electrode 106 and the electrically-conductive surface 107 to deposit the electrode material 111 within the aperture 105 (step 140). In one embodiment, the electrode material 111 forms a deposit 115 on the electrically-conductive surface 107 to modify flow through the aperture 105. The electrically-conductive surface 107 is not limited to the surfaces of the substrate 102, but may include electrically-conductive surfaces of the bond coat layer 103, other surfaces or coating layers that may be present on the or the within or near the aperture 105. In addition, the non-electrically-conductive layer 109 may be modified or otherwise configured to include portions having electrically conductive surfaces 107 for deposition thereon. In another embodiment, the modification of the aperture 105 includes any suitable modification, such as, but not limited to, sealing the aperture 105 to prevent flow, coating the aperture 105, creating turbulator shapes with the aperture 105, creating a shape or feature to direct, separate, or otherwise adjust the fluid flow profile, or a combination thereof.

During deposition of the electrode material 111, a first shielding gas flow is optionally directed at a tip portion 113 of the aperture penetrating electrode 106 to provide an inert gas curtain around a deposition site of the electrode material 111 (step 150). The tip portion 113 includes an insertable portion of the aperture penetrating electrode 106 and is not limited to the configuration shown in FIGS. 1-3 nor the geometry shown. A second shielding gas flow may also be directed at the tip portion 113 through the aperture 105 from a bottom surface of the substrate 102 (step 160). Shielding gas is well known to those skilled in welding processes, such as electrospark deposition, and reduces or eliminates the exposure to oxygen and other gases that are capable of contaminating the metal deposition site.

In one embodiment, the substrate 102 includes an electrically-conductive base material, such as, but not limited to, a metal or alloy material. In one embodiment, the electrically-conductive base material is a nickel-based superalloy or a cobalt-based superalloy.

In one embodiment, as shown in FIGS. 1-3, a non-electrically-conductive layer 109 is positioned on an outer surface of the substrate 102. The non-electrically-conductive layer 109 is any suitable coating, such as, but not limited to, a thermal barrier coating, yttria-stabilized-zirconia, or any other ceramic oxide. In one embodiment, the electrically-conductive surface 107 is, for example, a material that has a conductivity of about $10^2$ to $10^5$ $ohm^{-1}cm^{-1}$ and/or the non-electrically-conductive layer 109 is, for example, a material that has a resistivity of over 300 ohm cm. As shown in FIGS. 1-3, in one embodiment, the component 101 includes a bond coat layer 103 positioned between the non-electrically-conductive layer 109 and the substrate 102. The bond coat layer 103 increases adhesion between the substrate 102 and the non-electrically-conductive layer 109. A suitable bond coat layer 103 is or includes MCrAlY, wherein M is Co, Ni, Fe or any combination thereof. For example, suitable bond coat layers 103 include NiCrAlY, CoNiCrAlY, or FeNiCrAlY.

The one or more apertures 105 in the substrate 102 remain exposed through the non-electrically-conductive layer 109 and/or the bond coat layer 103. Within the exposed apertures 105, the electrically-conductive base metal of the substrate 102 remains uncovered forming the electrically-conductive surface 107. The aperture 105 includes any suitable opening in the substrate 102, such as, but not limited to, a cooling hole in a turbine component. For example, the aperture 105 may include a cooling hole, for example, in a blade, a nozzle, a combustion fuel nozzle, a combustion liner, a combustion cap, a bucket, a transition piece, or a shroud or the aperture 105 may include a fluid metering passage in components, such as combustion hardware for metering fuel or air, or the aperture 105 may include any other suitable component having an aperture through which a fluid passes. In one embodiment, the aperture 105 includes a predetermined diameter. In another embodiment, the diameter of the aperture penetrating electrode 106 is smaller than the predetermined diameter of the aperture 105 to permit insertion of the aperture penetrating electrode 106 into the aperture 105, and withdrawal of the aperture penetrating electrode 106 after deposition of the electrode material 111.

When energy is discharged from the power source, a direct current generates the arc between the aperture penetrating electrode 106 and the electrically-conductive surface 107. The aperture penetrating electrode 106 functions as the anode and the electrically-conductive surface 107 functions as the cathode. The arc ionizes the electrode material 111, which is transferred and deposited onto the electrically-conductive surface 107, for example within or near the aperture 105 using a short duration electrical impulse. Although the arc that is generated by the discharge of the capacitor is of a short duration, it has sufficient energy to melt a portion of the aperture penetrating electrode 106 causing the electrode material 111 to be accelerated through an arc formed between the negatively charged electrically-conductive surface 107 and the positively charged aperture penetrating electrode 106. Concurrent with deposition, the electrode material 111 is metallurgically alloyed into the electrically-conductive surface 107 within the aperture 105, forming a fully dense metallurgical bond. The time and energy involved are small enough that total heat input to the substrate 102 is minimal so that distortion and metallurgical structure changes of the substrate 102 are small or non-existent.

When the non-electrically-conductive layer 109 is positioned in predetermined areas between the aperture penetrating electrode 106 and the electrically-conductive base metal of the substrate 102, the resistivity of the non-electrically-conductive layer 109 reduces or eliminates the generation of the arc in the predetermined areas. For example, positioning of the non-electrically-conductive layer 109 over the outer surface of the substrate 102 reduces or eliminates the generation of the arc between the aperture penetrating electrode 106 and the outer surface of the substrate 102. In another example, the non-electrically-conductive layer 109 is proximal to the ESD torch 104 in comparison to the electrically-conductive surface 107. As the aperture penetrating electrode 106 is withdrawn from within the aperture 105, the proximally positioned non-electrically-conductive layer 109 reduces or eliminates deposit of the electrode material 111 on the outer surface of the substrate 102.

Referring to FIGS. 2-3, the electrode material 111 deposited within the aperture 105 forms the deposit 115. Energy is repeatedly discharged from the power source as necessary to transfer the electrode material 111 and increase a size of the deposit 115. Increasing the size of the deposit within the aperture 105 decreases a fluid flow through the aperture 105. For example, in one embodiment, the size of the deposit 115 is increased to decrease a diameter within a portion of the aperture 105, and at least partially choke the aperture 105. In another embodiment, repeatedly discharging energy increases the size of the deposit 115 to fill the aperture 105 and completely choke the aperture 105, preventing a fluid from flowing therethrough. The fluid includes a cooling fluid, a fuel, or any other suitable fluid for flow through the aperture 105.

In one embodiment, the method 100 includes testing the component 101 by measuring the fluid flow through the one or more apertures 105 to determine a measured fluid flow, and then comparing the measured fluid flow to a predetermined fluid flow value. In an alternate embodiment, testing the component 101 includes measuring a dimension of the one or more apertures 105 with an optical measurement device (e.g., laser), and then comparing the measured dimension to a predetermined dimension. The dimension includes any suitable measurable dimension, such as, but not limited to, a diameter, an area, or a combination thereof. When the measured fluid flow is greater than the predetermined fluid flow value, or the measured dimension is greater than the predetermined dimension, the apertures 105 are permitting excess fluid flow. The excess fluid flow may be reduced by modifying the apertures 105 through method 100.

The modification of the apertures 105 is performed to reduce fluid flow through the apertures 105 and/or provide a predetermined final flow profile, corresponding to a predetermined distribution, such as, but not limited to, a temperature distribution in a cooled component or a fuel flow distribution in a combustion component. The predetermined distribution may be selected based upon modeling, testing, measurements, observation of the component 101 after service (e.g., observation of coating conditions after service), or any other suitable selection method. For example, in one embodiment, the aperture 105 being modified includes the cooling hole at a location in the cooled component corresponding to the temperature to which the location is exposed. The aperture 105 is selected to be modified based upon its location on the component 101, the location corresponding to a cooler portion, or a portion subject to less harsh conditions during operation of the component 101. The location is determined from heat transfer models, by measurement of cooling flow, and/or by observing conditions of parts in each location. When selecting the cooling holes to modify to provide the correct cooling flow for the component 101, those cooling holes that are on cooler portions of the component 101 are subject to modification prior to those cooling holes in the component that are exposed to hotter or harsher conditions. Subsequent to selecting and modifying the cooling holes, the cooling flow is measured again and compared to the predetermined fluid flow value. The modifying of the cooling holes and measuring of the cooling flow is repeated until the measured cooling flow is reduced to at least the predetermined fluid flow value.

In another embodiment, the aperture 105 being modified includes a fuel nozzle in a combustion component of a gas turbine combustion system. The aperture 105 is selected to be modified based upon its location on the component 101 and the desired fuel injection amount. The desired fuel injection may correspond to a modeled combustion system or measured combustion or fuel flow characteristics during operation of the combustion component. Fuel flow rates through the fuel nozzle through the modification are restored or modified to achieve the desired flow. Restoring or modifying fuel flow provides positive emissions as well as positive financial implications.

In another embodiment, two or more of the apertures 105 are modified between each measurement of the fluid flow. In yet another embodiment, the apertures 105 are modified during measurement of the fluid flow and/or without removing the component 101 from a fluid flow measurement device. Modifying the apertures 105 during measurement of the fluid flow provides real-time fluid flow measurement to increase efficiency, reduce modification time, and/or reduce a number of discarded or scrapped components 101.

Figure 8:
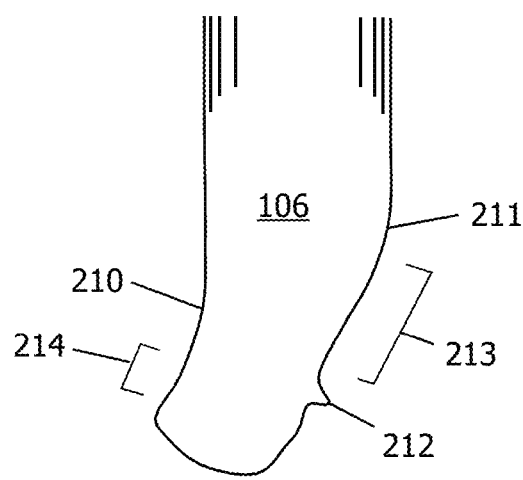
FIG. 8 shows an electrode in an embodiment of the disclosure.

The deposit 115 is tailored by features and composition of the aperture penetration electrode 106 and/or a shape of the tip portion 113 of the aperture penetrating electrode 106. In one embodiment, the aperture penetrating electrode 106 is shaped to permit contact normal to the electrically-conductive surface 107 of the aperture 105. In one embodiment, the aperture penetrating electrode 106 is shaped to increase or otherwise provide a high rate of deposition. In another embodiment, the aperture penetrating electrode 106 includes any suitable feature corresponding to a predetermined deposition pattern of the electrode material 111. Referring to FIG. 8 suitable features include, but are not limited to, a bend 210, a curve 211, a projection 212, a varied thickness along the length 213, a varied geometry along the length 214, or a combination thereof. For example, in one embodiment, one or more projections are disposed along a length of the aperture penetrating electrode 106, each projection affecting an amount of electrode material 111 deposited on a corresponding portion of the electrically-conductive surface 107. In another example, one or more varied shapes are included along a width of the aperture penetrating electrode 106, each shape forming a corresponding deposition of the electrode material 111 within the aperture 105. In one embodiment, the aperture penetrating electrode 106 is an assemblage of individual electrodes, permitting simultaneous deposition of electrode material 111 within a plurality of the apertures 105.

Figure 5:
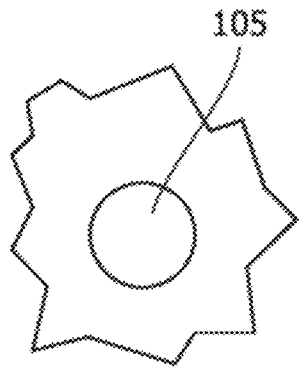
FIG. 5 shows a sectional view of an un-modified aperture.
Figure 6:
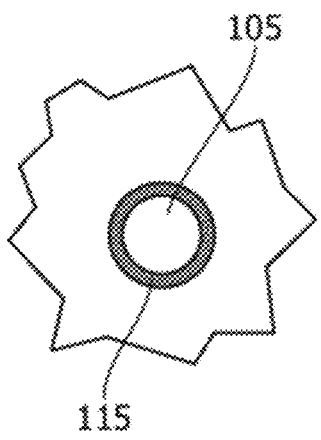
FIG. 6 shows a sectional view of modified aperture, according to an embodiment of the disclosure.
Figure 7:
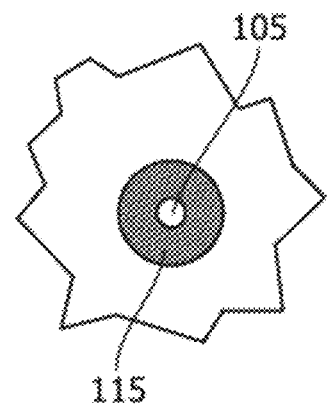
FIG. 7 shows a sectional view of modified aperture, according to an embodiment of the disclosure.
Figure 9:
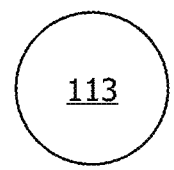
FIG. 9 shows an electrode tip portion in an embodiment of the disclosure.
Figure 10:
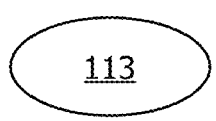
FIG. 10 shows an electrode tip portion in another embodiment of the disclosure.
Figure 11:
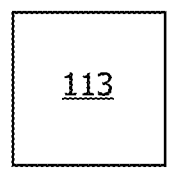
FIG. 11 shows an electrode tip portion in another embodiment of the disclosure.
Figure 12:
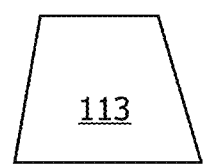
FIG. 12 shows an electrode tip portion in another embodiment of the disclosure.
Figure 13:
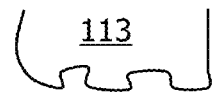
FIG. 13 shows an electrode tip portion in another embodiment of the disclosure.

The shape of the tip portion 113 of the aperture penetrating electrode 106 includes any suitable geometry tailored for forming a predetermined geometry of the aperture 105. For example, the geometry of the tip portion 113 may include a circle (FIG. 9), an oval (FIG. 10), a square (FIG. 11), a trapezoid (FIG. 12), projections (FIG. 13), non-symmetrical features (FIG. 13), or a combination thereof. In one embodiment, the features are included along a length of the tip portion 113 to provide deposition circumferentially along the surface within the aperture 105. In another embodiment, the tip portion 113 may be partially tapered to permit deposition of electrode material 111 on the electrically-conductive surface 107 within the aperture 105 to choke, or reduce the diameter of the aperture 105 to less than the diameter of the aperture penetrating electrode 106. For example, referring to FIGS. 2 and 3, as the aperture penetrating electrode 106 is withdrawn from the aperture 105, the partially tapered shape of the tip portion 113 continues to deposit electrode material 111 which continues to reduce the diameter of the aperture 105 to less than the diameter of the aperture penetrating electrode 106. FIGS. 5-7 show a sectional view of the aperture at various stages of modification. FIG. 5 shows an unmodified aperture 105 prior to deposition. FIG. 6 shows a modified aperture 105 with deposit 115 circumferentially located along the surface inside of the aperture 105 resulting in minor flow modification. FIG. 7 shows a modified aperture 105 with deposit 115 circumferentially located along the surface inside of the aperture 105 resulting in significant flow modification, wherein flow is highly restricted or stopped.

Selection of the aperture penetrating electrode 106 depends on the material being deposited, the desired final shape of the aperture, and the method of ESD deposition. In one embodiment, the aperture penetrating electrode 106 includes, but is not limited to, solid wire electrode, a stationary electrode, a rotating electrode, or an ultrasonic impact electrode, as shown in FIG. 1 through FIG. 3. In another embodiment, any suitable oxidation-resistant material can be used as the aperture penetrating electrode 106. For example, the electrode may be any oxidation-resistant alloy system, such as a nickel-based or cobalt-based superalloy, such as the same metal as the substrate or a compatible metal thereto, or a sintered metal alloy powder such as CoNiCrAlY. In one embodiment, the electrode includes multiple materials arranged in a layered or coaxial arrangement. In one embodiment, the electrode is consolidated from a powdered metal material and can be provided in a layered arrangement or in an arrangement where the layers blend into each other to produce a graded coating where the transition from one composition to another is gradual.

It should be understood that the ESD application methodology application is not limited to the details or methodology set forth in the following description or illustrated in the figures. It should also be understood that the phraseology and terminology employed herein is for the purpose of description only and should not be regarded as limiting.

It is important to note that the construction and arrangement of the system as shown in the various exemplary embodiments is illustrative only. Although only a few embodiments have been described in detail in this disclosure, those who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application.

It should be noted that although the figures herein may show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the application. Likewise, software implementations could be accomplished with standard programming techniques with rule based logic and other logic to accomplish the various connection steps, processing steps, comparison steps and decision steps.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for modifying flow through a component, comprising:
   an electrospark deposition torch removably supported in an electrode holder, the electrospark deposition torch including an aperture-penetrating electrode;
   wherein the aperture-penetrating electrode is configured to extend past a non-electrically-conductive layer of the component to apply an electrode material to an electrically-conductive surface in an aperture of the component to modify flow through the aperture of the component;
   wherein the aperture-penetrating electrode comprises a tip having a shape selected from the group consisting of circular cross section, an oval cross section, a square cross section, a trapezoidal cross section, a first projection, a non-symmetrical cross section, a taper, and a combination thereof;
   wherein the electrode comprises a plurality of materials;
   wherein the plurality of materials are arranged in layers of the electrode; and
   wherein the layers blend to produce a graded coating of the electrode.

2. The system of claim 1, wherein the aperture-penetrating electrode includes a feature for modifying the aperture.

3. The system of claim 2, wherein the feature is selected from the group consisting of a bend, a curve, a second projection, a variation in thickness along a length of the aperture-penetrating electrode, a variation in geometry along a length of the aperture-penetrating electrode, and a combination thereof.

4. The system of claim 1, wherein the aperture-penetrating electrode comprises a nickel-based superalloy or a cobalt-based superalloy.

5. The system of claim 1, wherein the electrode holder is a movable frame.

6. The system of claim 5, wherein the movable frame is capable of advancing the aperture-penetrating electrode into the aperture and withdrawing the aperture-penetrating electrode from the aperture.

7. The system of claim 1, wherein the electrospark deposition torch generates an arc for metallurgically alloying the electrode material into the electrically-conductive surface to form a deposit of the electrode material within the aperture.

8. The system of claim 1, wherein the aperture-penetrating electrode is of a type selected from the group consisting of a solid wire electrode, a stationary electrode, a rotating electrode, and an ultrasonic impact electrode.

9. The system of claim 1, wherein the plurality of materials are arranged coaxially in the electrode.

10. A system for modifying flow through a component, comprising:
    an electrospark deposition torch removably supported in an electrode holder, the electrospark deposition torch including an aperture-penetrating electrode;
    wherein the aperture-penetrating electrode is configured to extend past a non-electrically-conductive layer of the component to apply an electrode material to an electrically-conductive surface in an aperture of the component to modify flow through the aperture of the component;
    wherein the electrode comprises a plurality of materials;
    wherein the plurality of materials are arranged in layers of the electrode; and
    wherein the layers blend to produce a graded coating of the electrode.

11. The system of claim 10, wherein the aperture-penetrating electrode includes a feature for modifying the aperture.

12. The system of claim 11, wherein the feature is selected from the group consisting of a bend, a curve, a projection, a variation in thickness along a length of the aperture-penetrating electrode, a variation in geometry along a length of the aperture-penetrating electrode, and a combination thereof.

13. The system of claim 10, wherein the aperture-penetrating electrode comprises a nickel-based superalloy or a cobalt-based superalloy.

14. The system of claim 10, wherein the electrode holder is a movable frame.

15. The system of claim 14, wherein the movable frame is capable of advancing the aperture-penetrating electrode into the aperture and withdrawing the aperture-penetrating electrode from the aperture.

16. The system of claim 10, wherein the electrospark deposition torch generates an arc for metallurgically alloying the electrode material into the electrically-conductive surface to form a deposit of the electrode material within the aperture.

17. The system of claim 10, wherein the aperture-penetrating electrode is of a type selected from the group consisting of a solid wire electrode, a stationary electrode, a rotating electrode, and an ultrasonic impact electrode.

18. The system of claim 10, wherein the plurality of materials are arranged coaxially in the electrode.

* * * * *